United States Patent Office 3,162,453
Patented Dec. 22, 1964

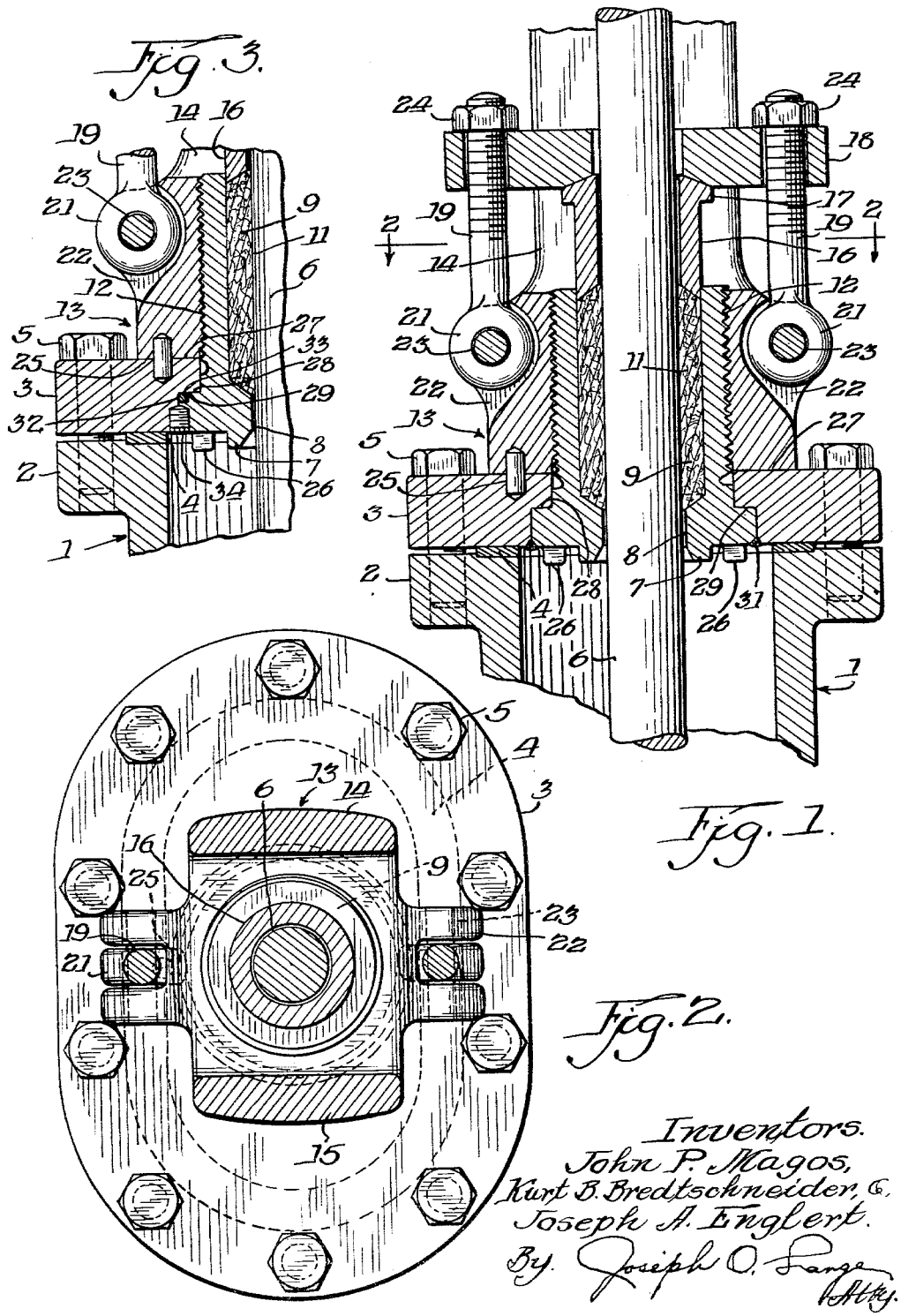

3,162,453
COMBINED VALVE STUFFING BOX AND BONNET MOUNTING
John P. Magos, Wilmette, and Kurt B. Bredtschneider and Joseph A. Englert, Chicago, Ill., assignors to Crane Co., Chicago, Ill., a corporation of Illinois
Filed May 14, 1963, Ser. No. 280,212
8 Claims. (Cl. 277—105)

This invention relates generally to a valve construction, and, more particularly, it is concerned with a closure assembly for valve bodies.

In order to have a better appreciation of the background for this contribution, it should be understood that of the many problems encountered in the field, particularly where corrosive fluids are used, the latter requirement is most severe and frequently calls for the substitution of suitable materials to meet such severe corrosive conditions referred to. In the valve design, for example, of valve body closures, especially provided for corrosive fluids, it becomes desirable frequently to fabricate the valve bonnet or the cover plate, the stuffing box, and the yoke either singly or together from different materials. From the standpoint of economic fabrication, it is desirable to provide that the bonnet, stuffing box, and the yoke are not cast or forged in one piece, but are made separately.

At the present time, such combinations of the bonnet and stuffing box refer to the employment of a strong leakproof fluid type unit with means for attachment of the yoke to the bonnet or to the stuffing box. The yoke must be properly aligned and capable of resisting rotational forces and bending moments from the valve operating unit to the bonnet. Often times these combinations, however, are relatively costly, and in many cases not to be considered entirely safe nor practical.

On the usual designs where the valve yoke is threadedly mounted onto the bonnet or the stuffing box with the conventional annular shoulder contact, the problem of proper alignment of the yoke arms to the valve central axis often has been difficult to obtain accurately. As a matter of fact, extra precautions had to be taken to transmit a rotational force without adversely affecting the said connection between the bonnet or yoke and the stuffing box.

Having the foregoing in mind, the present invention clearly avoids the prior difficulties referred to.

It is therefore an important object of this invention to provide a valve body closure which is not only practical and durable, but is also relatively economical to construct and maintain.

Another object is to provide for a valve closure or bonnet combination in which the repair, replacement, or inspection of the critical parts forming the closure assembly can be provided with a minimum of difficulty or inconvenience.

A further object of this invention is to provide for a valve closure construction in which such significant element as the valve stuffing box is not only easily replaceable or repaired, but cooperates with the bonnet and yoke of the valve in such a relatively simply manner as to insure valve tightness.

Other objects and advantages will become more readily apparent upon proceeding with the following description read in light of the accompanying drawing, in which:

FIG. 1 is a fragmentary sectional view of a preferred embodiment of the invention;

FIG. 2 is a fragmentary sectional view taken on line 2—2 of FIG. 1; and

FIG. 3 is a fragmentary sectional view of a modified form of our invention.

Similar reference numerals refer to similar parts throughout the several views.

Referring now to FIG. 1, the valve body or casing, generally designated 1, is shown, and it will be appreciated that the casing may be for a globe valve, or a gate valve, or a stop check valve, since the invention is capable of use on a wide variety of valve types. The valve casing at its upper portion is provided with the annular flange 2 for the purpose of providing a fluid sealing connection of a bonnet 3, having interposed preferably a sealing gasket 4, which is held in fluid tight relation by means of the connecting bolt studs 5, for effecting said connection between the bonnet 3 and the casing 1.

The bonnet 3, while shown as being relatively oval and plate-like in configuration when viewed in plan, may, of course, embody other configurations, depending upon the type of valve with which said bonnet is employed. A conventional valve stem 6 is journaled within the valve closure as shown and, more specifically, is received within a stuffing box 7, having the lower opening 8 to receive said stem. The stuffing box beyond the opening 8 is provided with a chamber 9 to receive the packing 11, and on its outer periphery portion, the stuffing box 7 is threaded at 12 for engagement with the yoke, generally designated 13, having the oppositely disposed yoke arms 14 and 15. It will be appreciated that the stuffing box and packing may be replaced by a suitable O-ring arrangement depending upon service conditions encountered.

At the upper end portion of the chamber 9, a gland member 16 is provided, having the usual enlarged portion 17 for engagement by a gland flange 18 and provided with the depending eyebolts 19 and the eyelet portions 21. This is more clearly shown in the sectional view of FIG. 2. The oppositely apertured yoke lugs 22 through which a spanning pin 23 extends for projection through the eyelet 21 is shown more clearly in FIG. 1. Thus, by suitably adjusting the gland stud nuts 24, the proper or desirable compression load can be applied to the packing 11 within the stuffing box 7. Preferably, in order to hold the yoke 13 against relative rotation with respect to the bonnet 3, the interposed pin 25 is mounted for such purpose. It will thus be appreciated that by virtue of the stuffing box threads 12 engaging the similar threads of the yoke 13, and said stuffing box by reason of the annularly spaced lugs 26 by means of a special wrench or similar tool (not shown), the desired connection for the mounting to the stuffing box and the yoke is easily accomplished.

Thus, in assembly, the yoke 13 will abut tightly against the bonnet surface 27 to firmly position the yoke upon the bonnet and the annular shoulder surface 28 of the stuffing box 7 will likewise draw up the stuffing box of said surface to abut against the inner shoulder surface 29 of the bonnet 3. To complete the assembly, an annular sealing weld is disposed at 31, but it should be understood that if for any reason the annular seal weld 31 is not desired or needed since fluid tight seals are effected at 28 and 29, it may be omitted and in its place a lock weld or tack weld (not shown) may be employed at the same location.

From the discussion herein above recited, it will now be clear that the yoke member 13 can be easily centered properly relative to the valve bonnet 3, and at the same time provide for the yoke arms 14 and 15 being positioned in the desired location relative to the valve central axis because in effecting said assembly the only rotating member is the stuffing box 7. By simply rotating the stuffing box member 7, while the yoke is maintained in fixed position, being held against rotation by means of the interposed pin 25, a substantial assembly of elements is accomplished capable of withstanding the normal internal fluid pressures encountered. At the same time, the thrust of the stem member 6 is resisted and including the bending moments while rotational force is being transmitted from the yoke directly to the bonnet. It will be noted also that by virtue of the shoulder connection between the bonnet and the stuffing box represented by the annular shoulder surfaces 28 and 29, the weld 31 is protected against bending stresses and excessive pressure loads.

Referring now to the modified form of construction illustrated in FIG. 3, in all respects the construction is similar to that previously described in FIG. 1 and FIG. 2 except that in such installations where relatively lower temperatures are encountered the seal weld 31 can be replaced by the use of an O-ring 32, suitably received within a chamber 33, for effecting the fluid seal between the surfaces 28 and 29. In this construction, in order to hold the assembly against relative rotation between the stuffing box 7, and the bonnet 3, a lock screw 34 is used. It will be clear that the assembly of FIG. 3 lends itself beneficially to construction, avoiding the welding as at 31 and therefore is more easily disassembled in the field.

It will be appreciated that while two embodiments have been shown and described, the invention is capable of being embodied in a wide variety of forms and construction that depart from the spirit of the invention. Therefore, it is the desire that the measure of this invention should be defined by the scope of the appended claims considered in light of the prior art.

We claim:

1. In a valve, means for supporting an actuating mechanism including a stem, a body, a yoke, a bonnet for the yoke between said body and yoke, means for securing said yoke to said bonnet member in fluid sealing relation, said securing means consisting of a threaded hollow member, the latter member providing a stuffing box for said stem, packing therefor, bolting means to compress the packing, means for inhibiting relative rotation between said yoke and bonnet.

2. In a valve, means for supporting an actuating mechanism including a stem, a body, a yoke, a bonnet for the yoke between said body and yoke, the said bonnet having an inner annular recessed portion, means for securing said yoke to said bonnet member in fluid sealing relation, said securing means consisting of a threaded hollow member received in said bonnet inner annular recessed portion, said hollow member providing a stuffing box for said stem, packing therefor, bolting means to compress the packing, annularly disposed means for predetermined rotative positioning of the yoke on said bonnet and for inhibiting relative rotation between said yoke and bonnet.

3. In a valve, means for supporting an actuating mechanism including a stem, a body, a yoke, a bonnet for the yoke between said body and yoke, said bonnet having an undersurface forming a shouldered recess therein, means for securing said yoke to said bonnet member, said securing means consisting of a threaded hollow member having an enlarged flange portion abutting against said undersurface of the bonnet in fluid sealing relation, said hollow member providing fluid sealing means for said stem, and yoke positioning means for inhibiting relative rotation between said yoke and bonnet.

4. The subject matter of claim 3, a seal weld annularly disposed between said hollow member and said bonnet.

5. The subject matter of claim 3, fluid sealing means disposed in an annular recess between said hollow member and said bonnet.

6. The subject matter of claim 3, lock screw means for inhibiting relative rotation between said hollow member and said bonnet.

7. The subject matter of claim 3, means on an inner surface portion of said hollow member for facilitating the tightening of said threaded hollow member and said yoke to said bonnet.

8. In a valve, means for supporting and journaling an actuating mechanism including a stem, a body, a yoke, a bonnet for the yoke mounted between said body and yoke, means for securing said yoke to said bonnet member in fluid sealing relation, said securing means consisting of a hollow member having means for attachment to said yoke whereby to clamp said bonnet therebetween, the said hollow member providing fluid sealing means for said stem, and means located in a plurality of planes for inhibiting relative rotation between said yoke, hollow member and bonnet.

References Cited in the file of this patent

UNITED STATES PATENTS

| | | |
|---|---|---|
| 2,245,648 | Campbell | June 17, 1941 |
| 2,555,262 | Weinberg | May 29, 1951 |